US012719208B2

(12) United States Patent
Matsumoto et al.

(10) Patent No.: US 12,719,208 B2
(45) Date of Patent: Aug. 25, 2026

(54) CONNECTOR HAVING A LOCK MEMBER FOR KEEPING A CONNECTOR HOUSING AT A MATED STATE WITH A MATING CONNECTOR

(71) Applicant: J.S.T. Mfg. Co., Ltd., Tokyo (JP)

(72) Inventors: Hiroyuki Matsumoto, Yokohama (JP); Yoshinori Hayakawa, Yokohama (JP); Kazuya Izawa, Yokohama (JP); Hayato Chiba, Yokohama (JP)

(73) Assignee: J.S.T. MFG. CO., LTD., Tokyo (JP)

( * ) Notice: Subject to any disclaimer, the term of this patent is extended or adjusted under 35 U.S.C. 154(b) by 296 days.

(21) Appl. No.: 18/523,210

(22) Filed: Nov. 29, 2023

(65) Prior Publication Data

US 2024/0204454 A1 Jun. 20, 2024

(30) Foreign Application Priority Data

Dec. 19, 2022 (JP) ................................ 2022-201976

(51) Int. Cl.
*H01R 13/627* (2006.01)

(52) U.S. Cl.
CPC ................................ *H01R 13/6275* (2013.01)

(58) Field of Classification Search
CPC .. H01R 13/6275; H01R 13/639; H01R 24/00; H01R 13/4223; H01R 13/6582
See application file for complete search history.

(56) References Cited

U.S. PATENT DOCUMENTS

| | | | | |
|---|---|---|---|---|
| 7,473,124 | B1 * | 1/2009 | Briant | H01R 13/629 439/352 |
| 8,562,373 | B2 * | 10/2013 | Wu | H01R 13/6335 439/352 |
| 11,942,732 | B2 * | 3/2024 | Yu | H01R 12/771 |
| 2023/0070433 | A1 * | 3/2023 | Yu | H01R 12/716 |
| 2023/0199986 | A1 * | 6/2023 | Cano Salomo | H01R 13/508 312/223.1 |
| 2023/0327379 | A1 * | 10/2023 | Li | H01R 13/659 |
| 2024/0258746 | A1 * | 8/2024 | Demaratos | H01R 13/639 |
| 2024/0291193 | A1 * | 8/2024 | Schwarz | H01R 13/6582 |

FOREIGN PATENT DOCUMENTS

JP 2005-197184 A 7/2005

* cited by examiner

*Primary Examiner* — Edwin A. Leon
(74) *Attorney, Agent, or Firm* — Kratz, Quintos & Hanson, LLP

(57) ABSTRACT

A connector includes at least one contact, a connector housing that holds the contact inside thereof and that includes a fixing slot in one of outer surfaces thereof and an introduction opening that communicates to the fixing slot on a rear side in a mating direction of the connector, a lock member that is press-fitted and fixed to the fixing slot by being inserted from the introduction opening along the mating direction, and keeps a mated state with a mating connector when being locked to a portion to be locked of the mating connector, and a retaining member that is fixed to the introduction opening by being inserted from a direction different from the mating direction and prevents movement of the lock member rearward in the mating direction.

7 Claims, 9 Drawing Sheets

FIG.2A
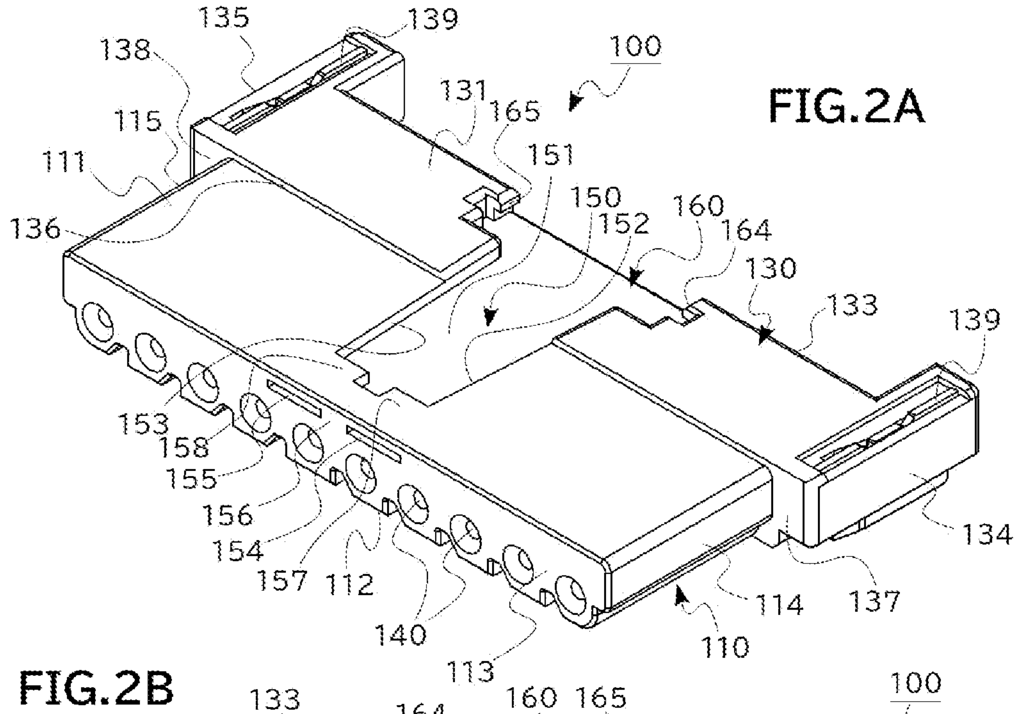
FIG.2B
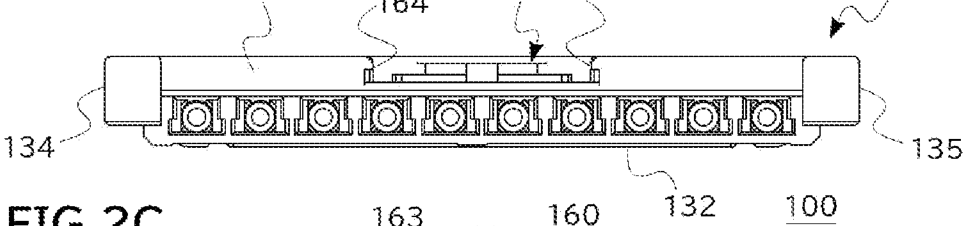
FIG.2C
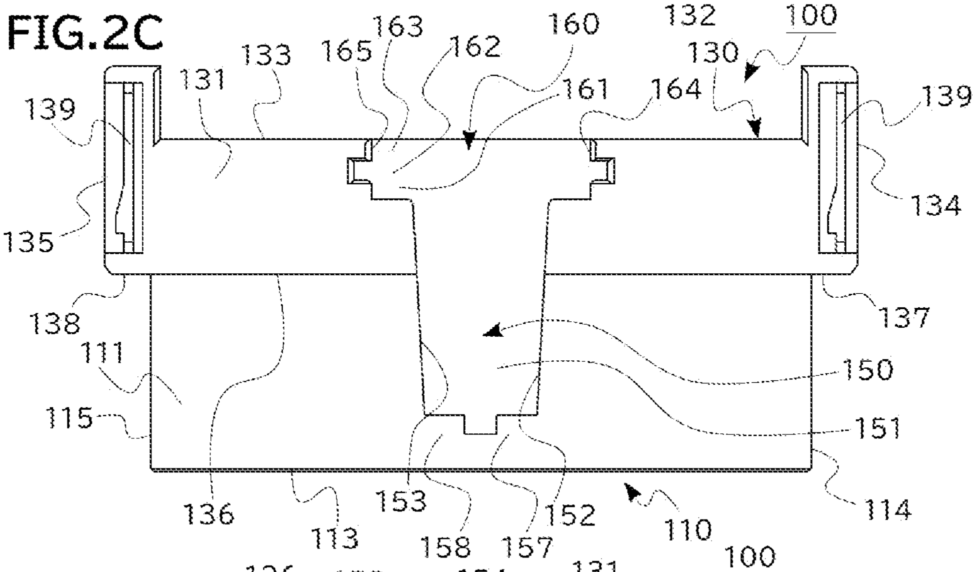
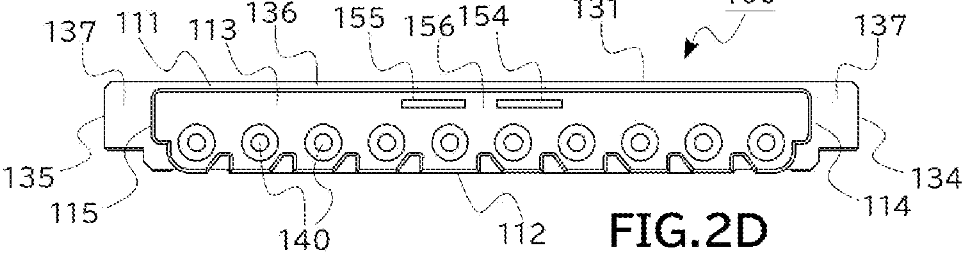
FIG.2D

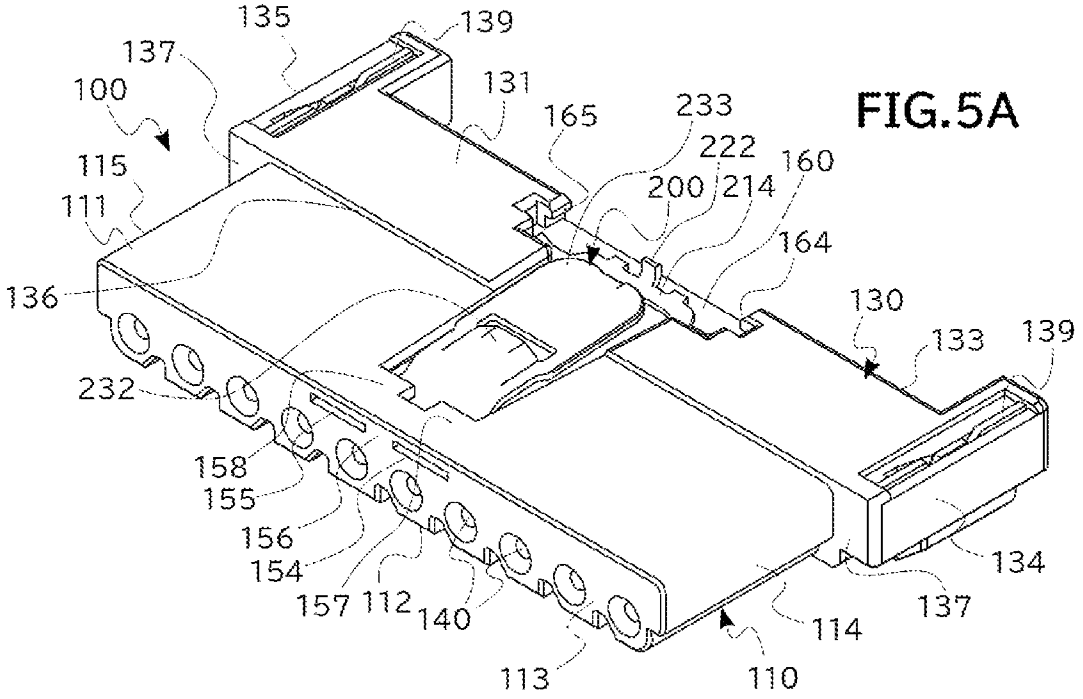
FIG.5A
FIG.5B
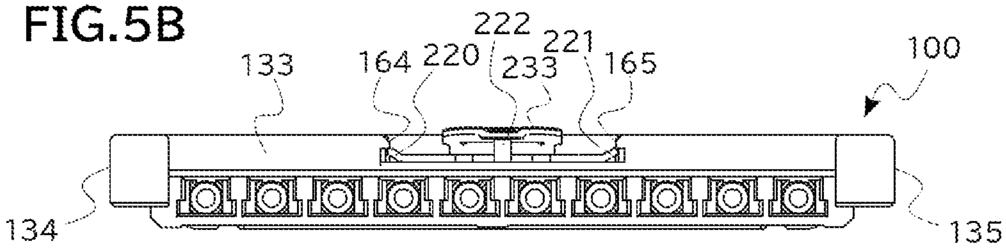
FIG.5C
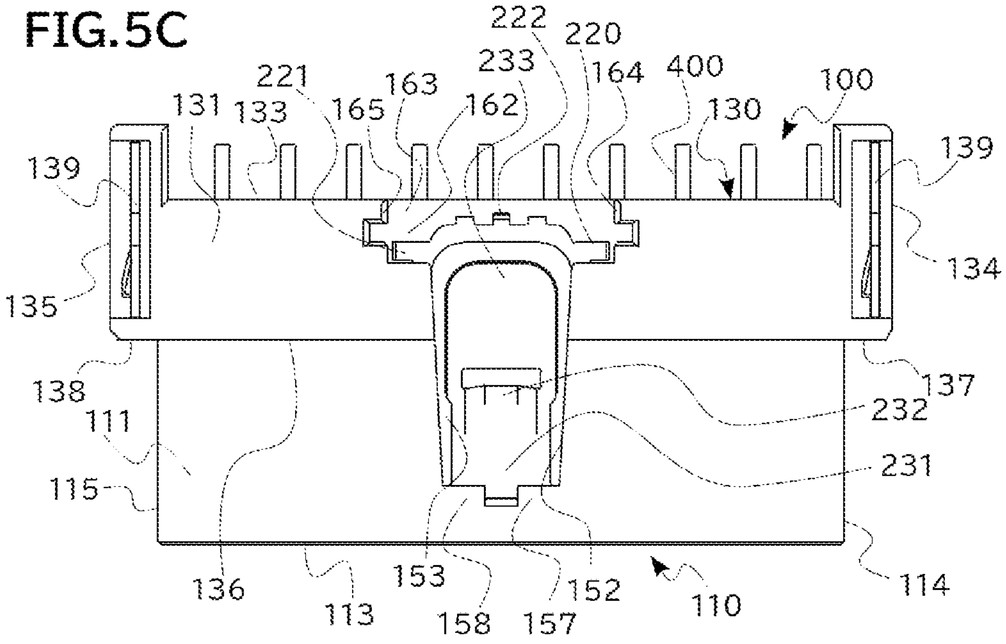

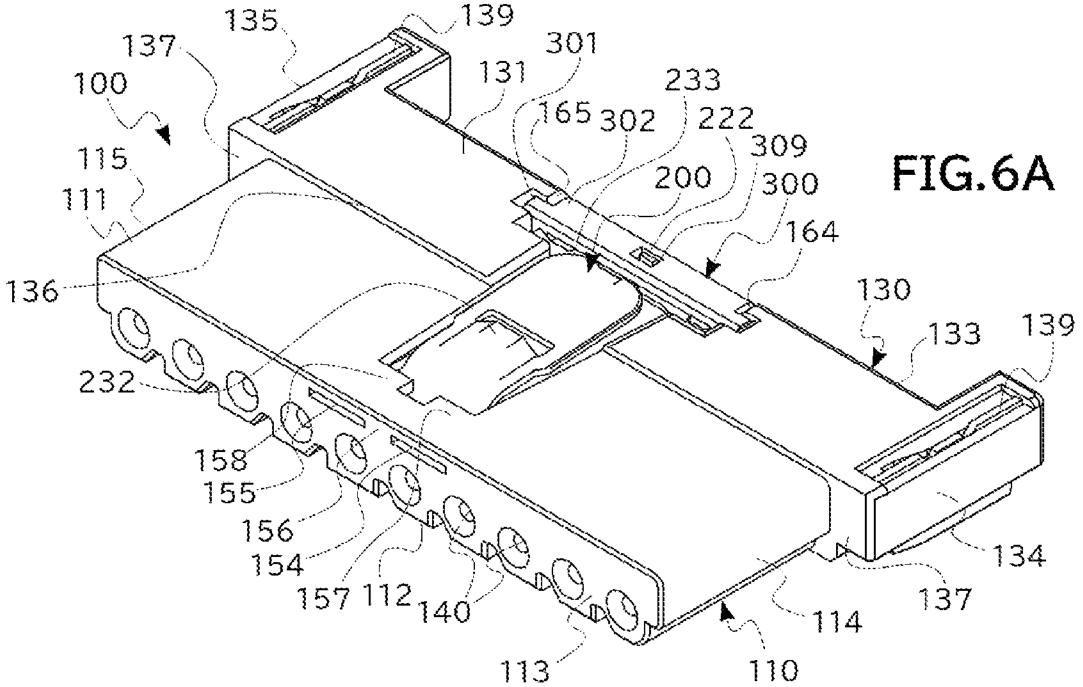
FIG.6A
FIG.6B
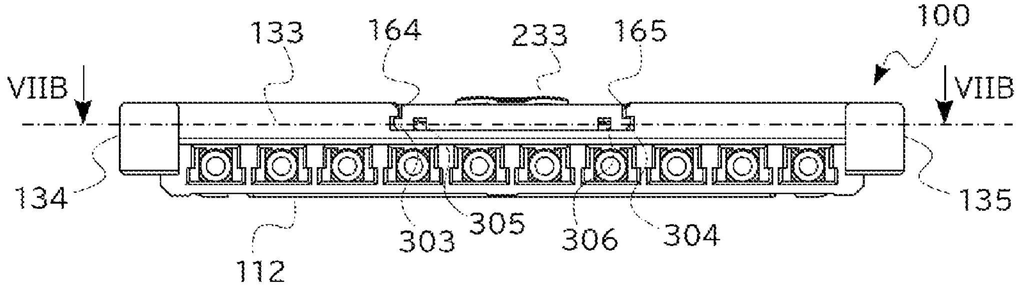
FIG.6C
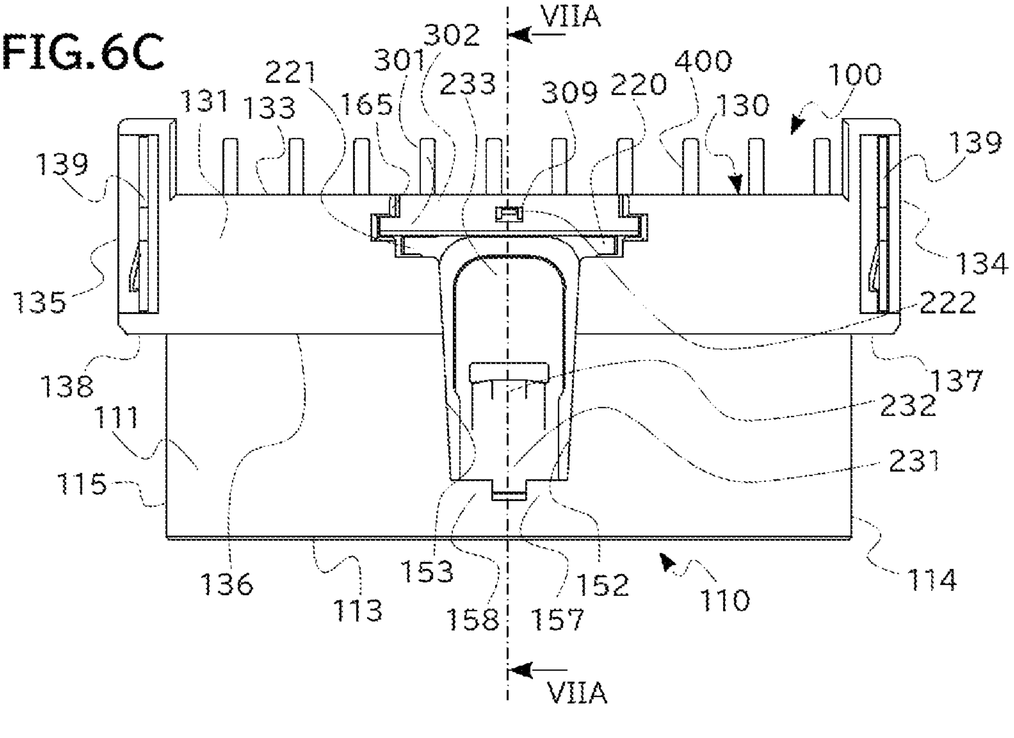

FIG.8A
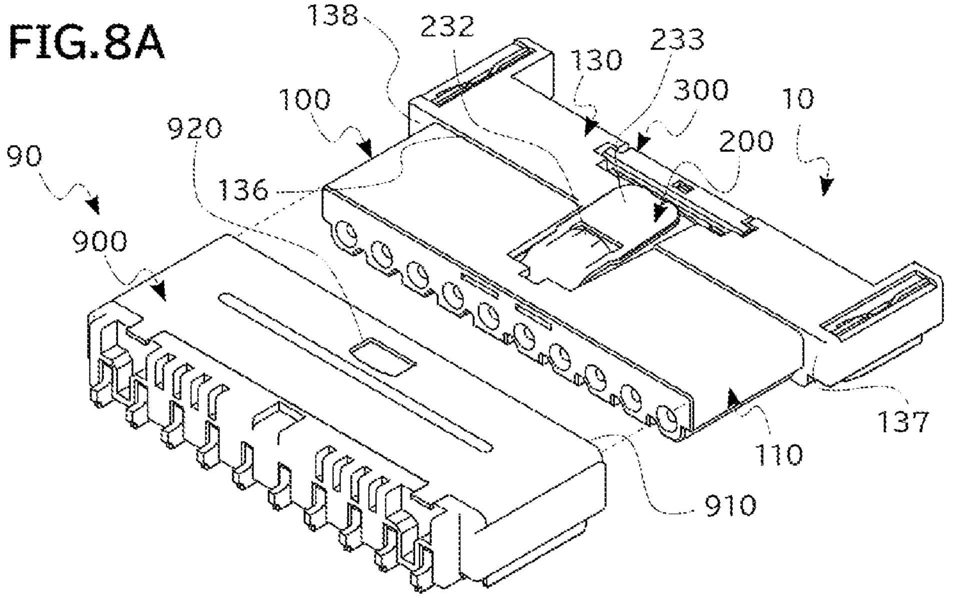
FIG.8B
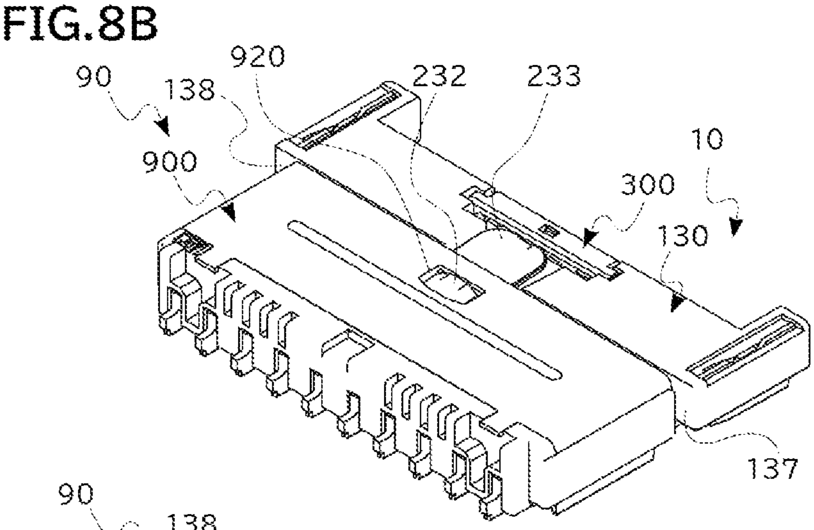
FIG.8C
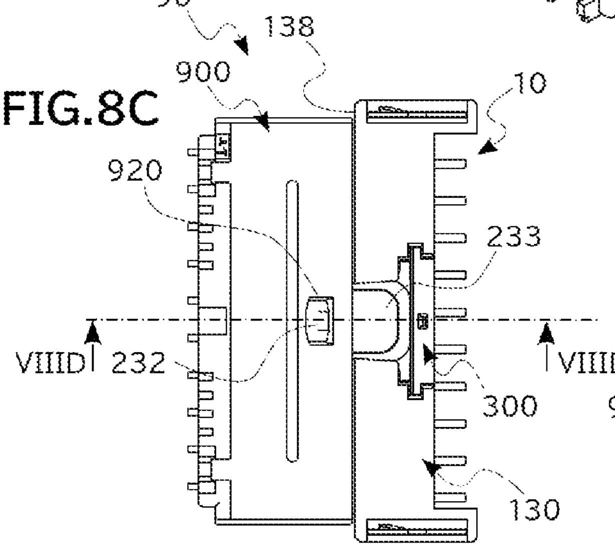
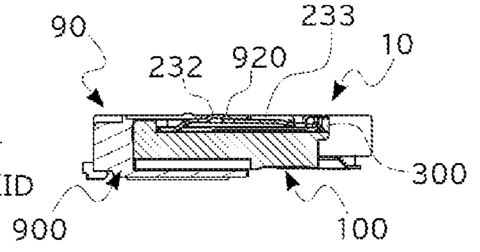
FIG.8D

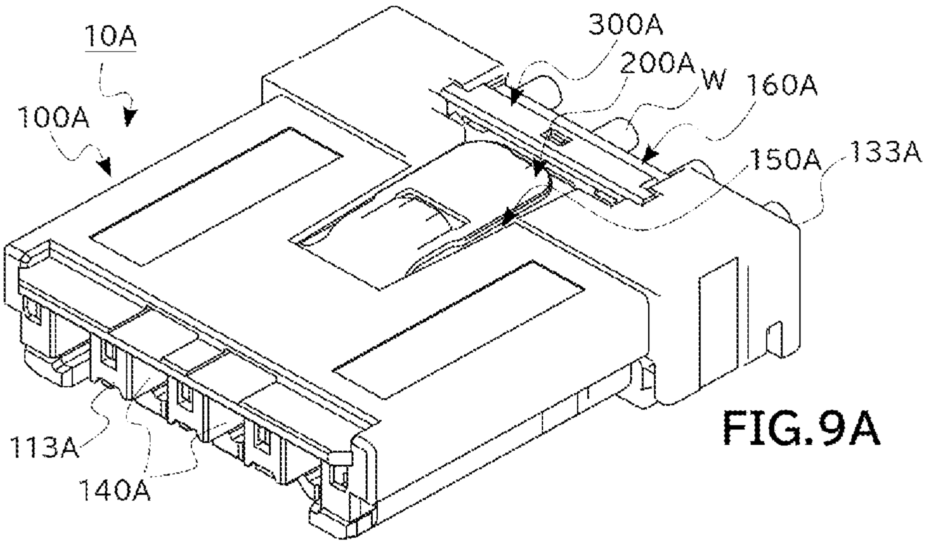
FIG.9A
FIG.9D
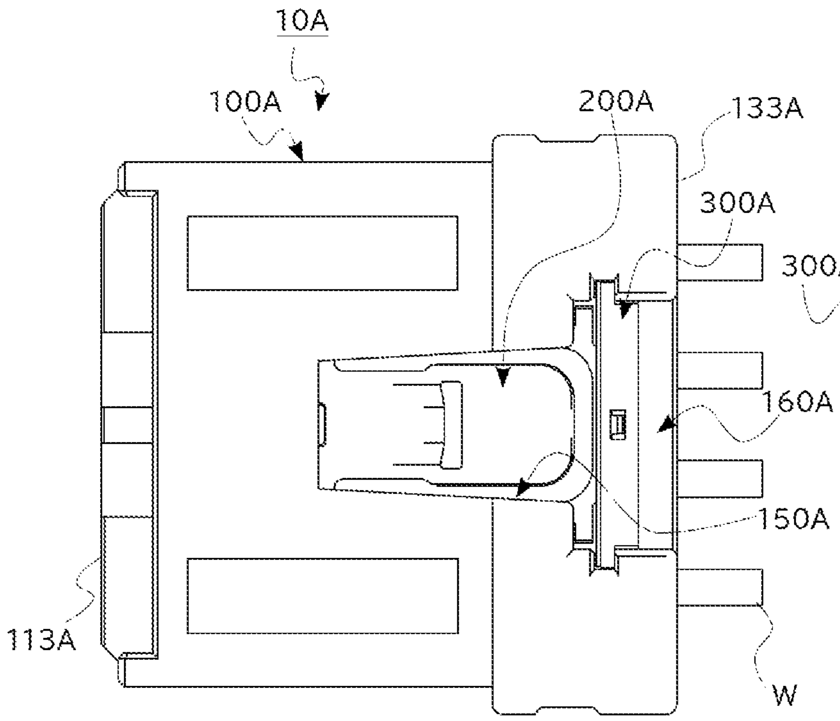
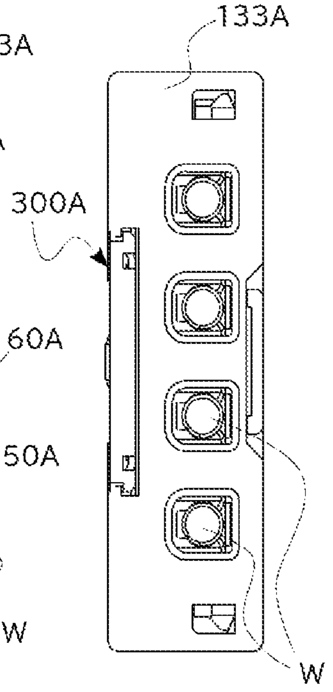
FIG.9B
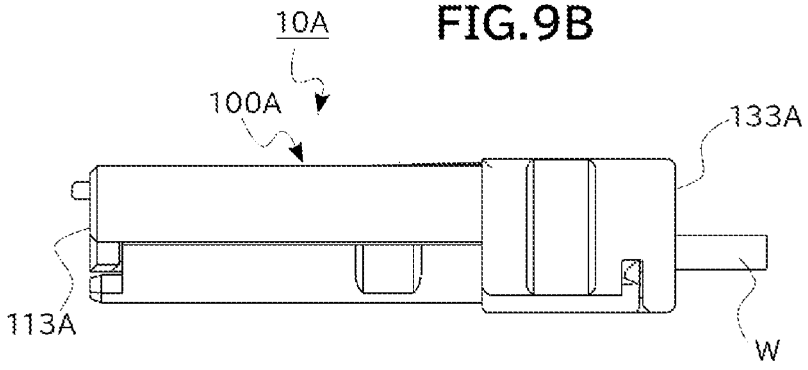
FIG.9C

CONNECTOR HAVING A LOCK MEMBER FOR KEEPING A CONNECTOR HOUSING AT A MATED STATE WITH A MATING CONNECTOR

CROSS-REFERENCE TO RELATED APPLICATION

This application is based on and claims priority under 35 USC 119 from Japanese Patent Application No. 2022-201976 filed on Dec. 19, 2022, the disclosure of which is incorporated by reference herein.

BACKGROUND OF THE INVENTION

The present invention relates to a connector, particularly a connector that holds or locks a mated state with a mating connector when fitted to the mating connector.

Conventionally, a cantilevered lock arm has been integrally formed on a housing upper surface of a female connector in order to hold a mated state of a male connector and the female connector fitted to each other. This lock arm is locked in a corresponding hole to be locked in the housing of the male connector so as to prevent the housings of the fitted male and female connectors from being disengaged from each other. However, the resin-made lock arm formed integrally with the housing needs to have a sufficient thickness in the height direction orthogonal to the mating direction in order to maintain strength. Therefore, in order to reduce the thickness in the height direction, there is a connector in which a metal lock member separate from a housing of a female connector is press-fitted and fixed to the housing of the female connector.

In addition, a metal lock of the invention described in JP 2005-197184 A is provided by forming a slit in a main body portion covering an upper surface and a side surface of a female housing, and the main body portion protrudes laterally and is provided with a retaining portion that is press-fitted and held on the female housing side surface.

The metal lock described in JP 2005-197184 A is attached to the female housing only by press-fitting, and may easily fall off. In addition, a structure for preventing the metal lock from falling off is large-scale.

BRIEF SUMMARY OF THE INVENTION

An object of the present invention is to provide a connector having a fall prevention configuration that prevents a lock member provided separately from a connector housing from falling off from the connector housing when the lock member is attached to the connector housing.

In order to solve the above problem, a connector according to the present invention includes:

- at least one contact;
- a connector housing that holds the contact inside thereof and that includes a fixing slot in one of outer surfaces thereof and an introduction opening that communicates to the fixing slot on a rear side in a mating direction of the connector;
- a lock member that is press-fitted and fixed to the fixing slot by being inserted from the introduction opening along the mating direction, and keeps a mated state with a mating connector when being locked to a portion to be locked of the mating connector; and
- a retaining member that is fixed to the introduction opening by being inserted from a direction different from the mating direction and prevents movement of the lock member rearward in the mating direction.

Further, in one aspect of the present invention, both a rear side of the introduction opening in the mating direction and one side of the introduction opening in a vertical direction orthogonal to the mating direction are communicative to an outside.

Further, in one aspect of the present invention, a width of the introduction opening is narrower than a width of the retaining member at a rear side in the mating direction.

Further, in one aspect of the present invention, a width of the introduction opening is narrower on a front side thereof than on a rear side thereof in an insertion direction orthogonal to both the mating direction and the width direction, and a width of the retaining member is wider on a rear side thereof than on the front side thereof in the insertion direction.

Further, in one aspect of the present invention, the retaining member includes a locking claw, the introduction opening includes a protrusion to be locked corresponding to the locking claw, and the locking claw and the protrusion to be locked are engaged with each other by a snap-type locking structure.

In one aspect of the present invention, the lock member includes, at a rear end in the mating direction, an abutting portion that is bent frontward in an insertion direction orthogonal to both the mating direction and a width direction orthogonal to the mating direction and abuts on the retaining member.

Further, in one aspect of the present invention, the lock member includes a positioning protrusion bent frontward in the insertion direction on a rear side in the mating direction, and the retaining member includes a positioning opening that receives the positioning protrusion.

According to one aspect of the present invention, it is possible to prevent the lock member from falling off from the connector housing.

According to one aspect of the present invention, the lock member can be introduced into a fixing slot from a rear side in a mating direction, and a retaining member can be inserted into an introduction opening from a direction orthogonal to the mating direction.

According to one aspect of the present invention, it is possible to prevent the lock member press-fitted into the fixing slot and the retaining member attached to the introduction opening from moving backward in the mating direction of the connector.

According to one aspect of the present invention, it is possible to prevent the retaining member attached to the introduction opening from falling off to a front side in an insertion direction orthogonal to both the mating direction and a width direction of the connector.

According to one aspect of the present invention, as compared with a case of using a retaining member not having a snap-type locking structure, the retaining member can be easily fixed to the introduction opening, and the fixed state can be maintained.

According to one aspect of the present invention, it is possible to prevent the lock member press-fitted into the fixing slot from moving backward in the mating direction of the connector.

According to one aspect of the present invention, the retaining member can be accurately positioned and fixed to the introduction opening, and the lock member can be prevented from moving backward in the mating direction.

BRIEF DESCRIPTION OF THE DRAWINGS

FIG. 2A is an external perspective view of a female connector housing of the embodiment;

FIG. 2B is a rear view of the female connector housing;

FIG. 2C is a top view of the female connector housing;

FIG. 2D is a front view of the female connector housing;

FIG. 5A is an external perspective view when the lock member is attached to the female connector housing, FIG. 5B is a rear view of FIG. 5A;

FIG. 5C is a top view of FIG. 5A;

FIG. 6A is an external perspective view when both the lock member and the retaining member are attached to the female connector housing;

FIG. 6B is a rear view of FIG. 6A;

FIG. 6C is a top view of FIG. 6A;

FIG. 8A is a perspective view illustrating a state in which the female connector is to be mated to a male connector which is a mating connector;

FIG. 8B is a perspective view illustrating a state in which the female connector and the male connector are mated to each other;

FIG. 8C is a top view of FIG. 8B;

FIG. 8D is a cross-sectional view taken along line VIIID-VIII of FIG. 8C;

FIG. 9A is an external perspective view of a female connector according to a modified embodiment;

FIG. 9B is a top view of FIG. 9A;

FIG. 9C is a right side view of FIG. 9A; and

FIG. 9D is a rear view of FIG. 9A.

DETAILED DESCRIPTION OF THE INVENTION

A female connector 10 according to an embodiment will be described with reference to the drawings. Note that the embodiments described below are described by exemplifying the connector of the present invention, but the present invention is not limited thereto. The present invention should equally apply to other forms and types of connectors described in the claims.

Figure 1A:
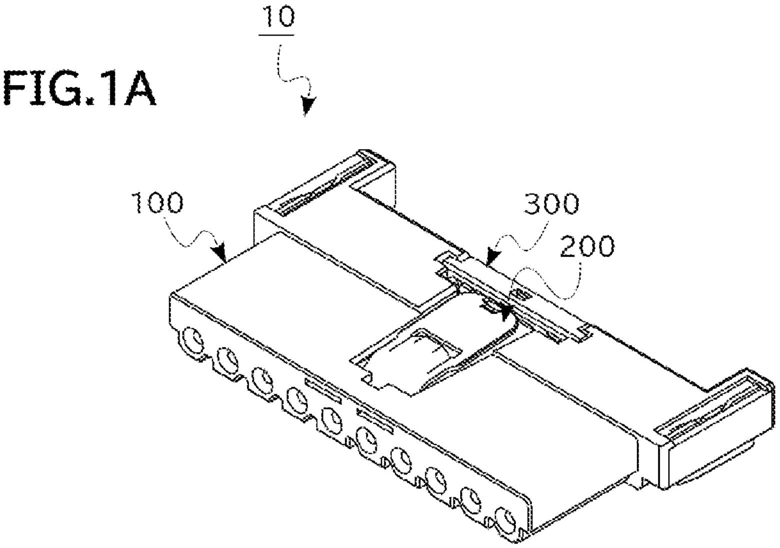
FIG. 1A is an external perspective view of a female connector according to an embodiment.
Figure 1B:
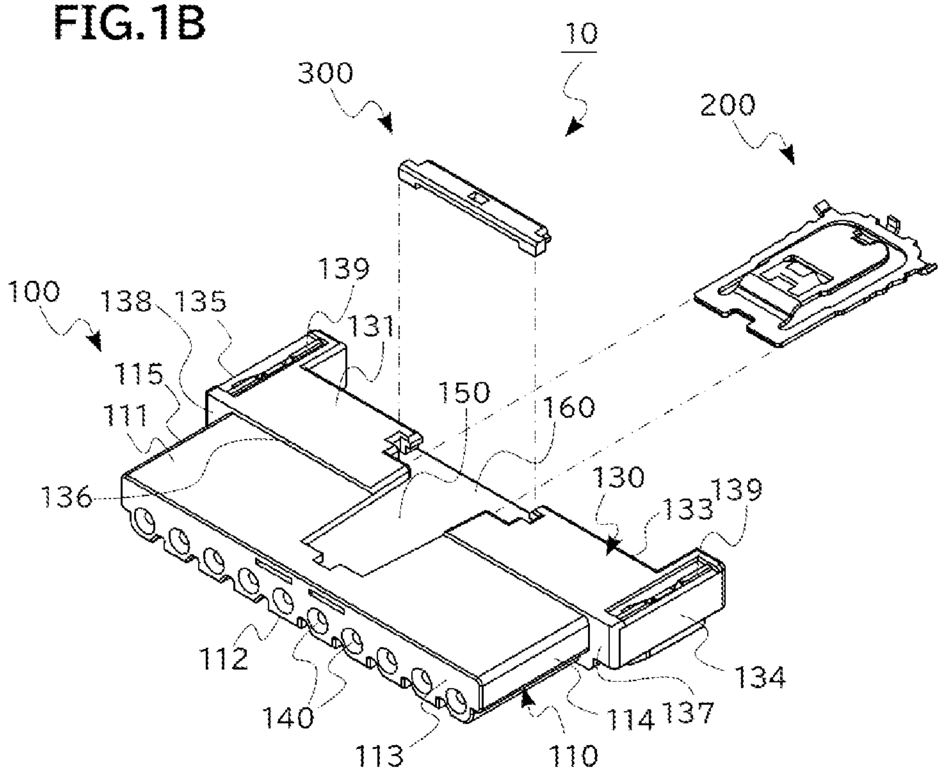
FIG. 1B is an exploded perspective view of the female connector.
Figure 3C:
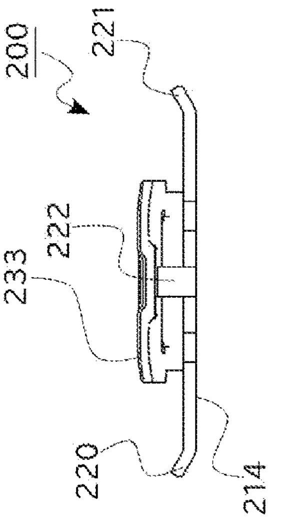
FIG. 3C is a rear view of the lock member.
Figure 3B:
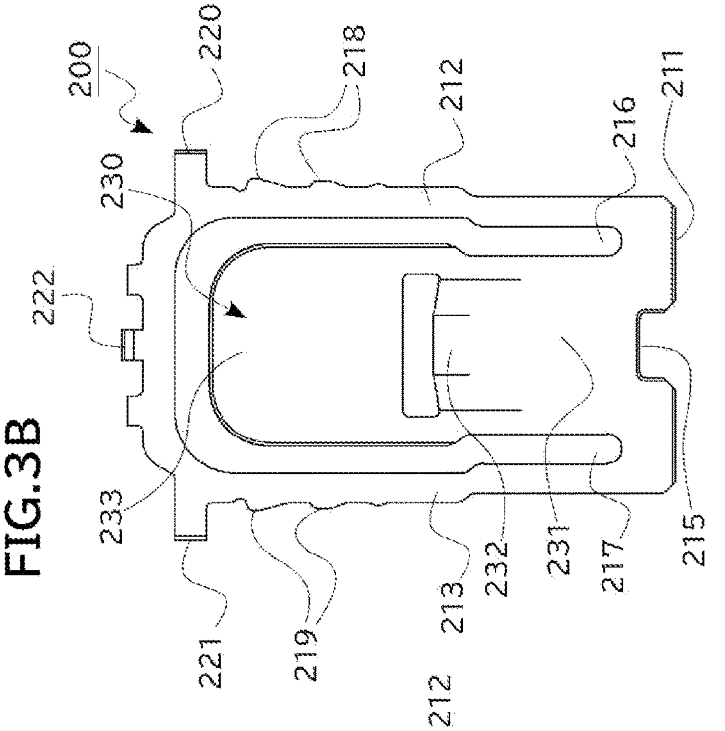
FIG. 3B is a top view of the lock member.
Figure 3A:
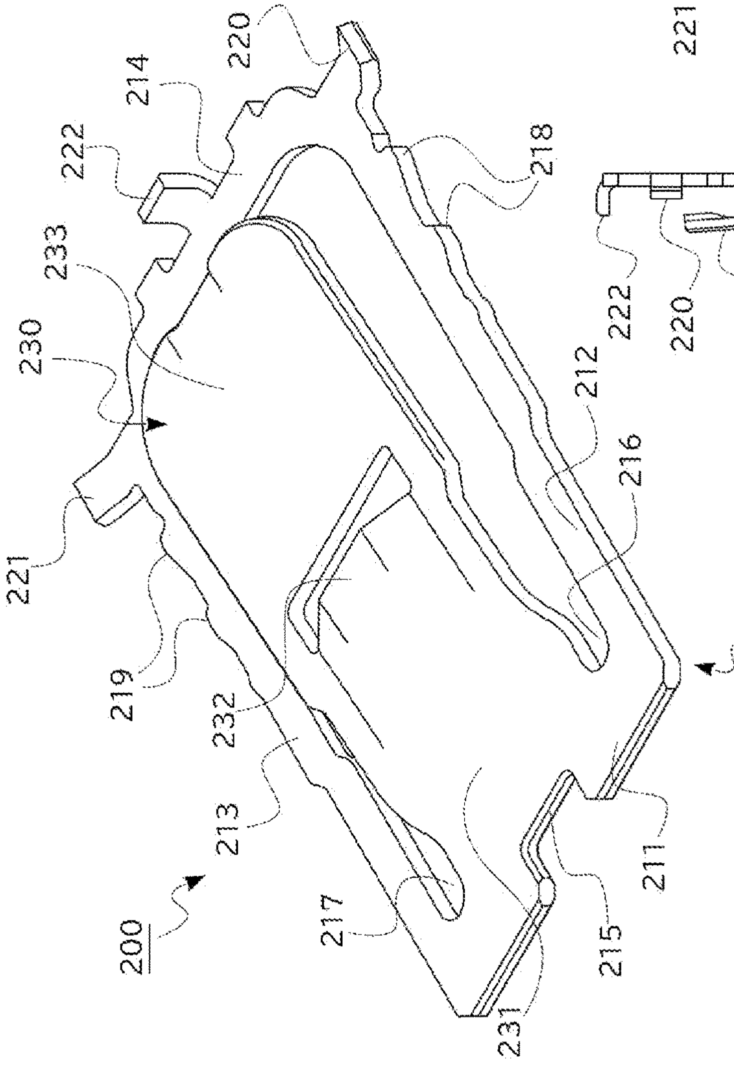
FIG. 3A is an external perspective view of a lock member of the embodiment.
Figure 3D:
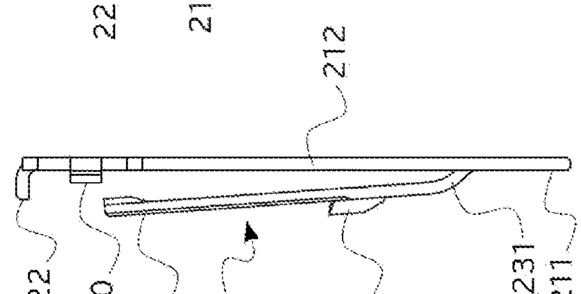
FIG. 3D is a right side view of the lock member.
Figures 4A, 4B, 4C, 4D, 4E, 4F, 4G:
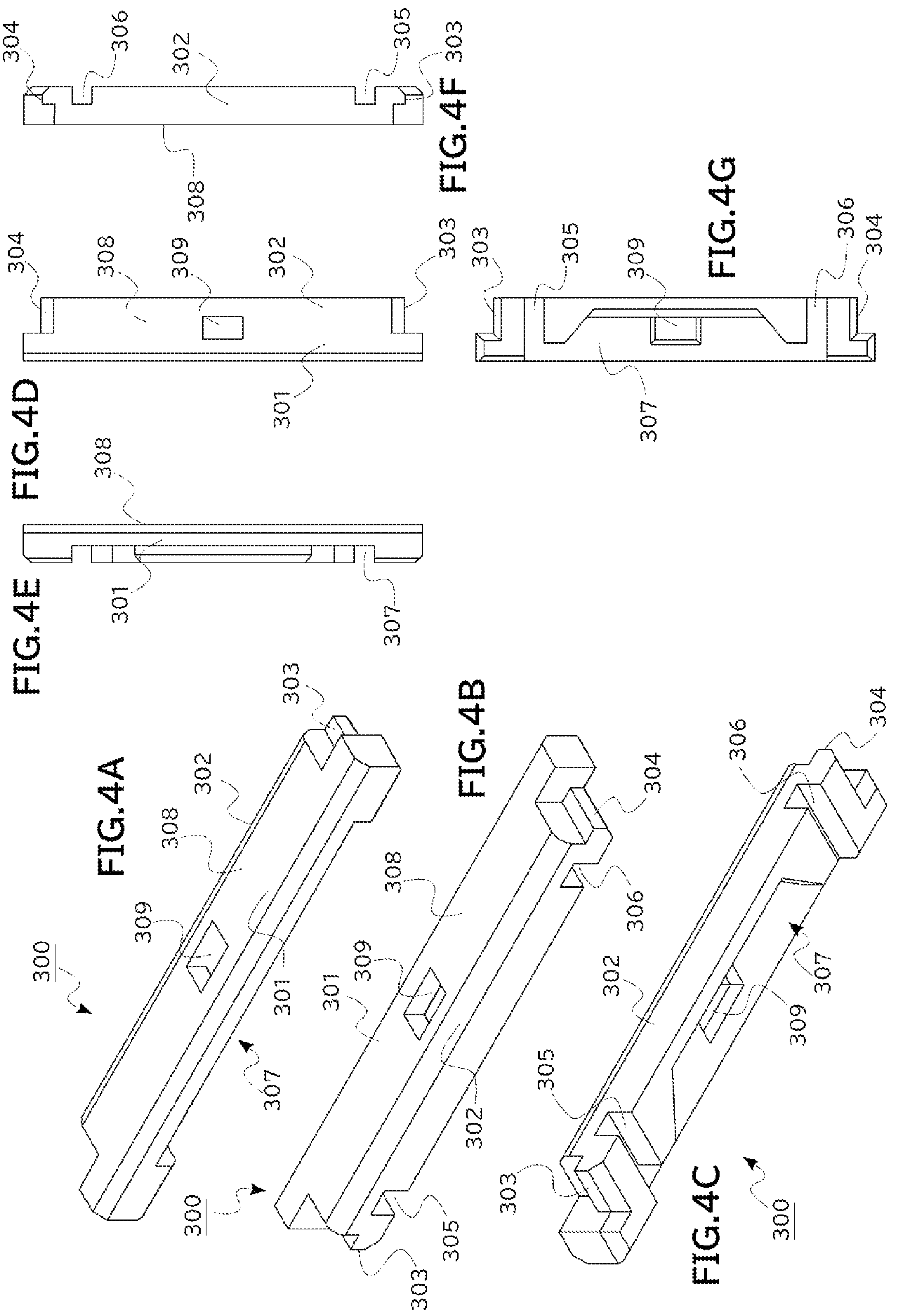
FIG. 4A is an external perspective view of a retaining member of the embodiment as viewed from an upper front side.
FIG. 4B is an external perspective view of the retaining member as viewed from an upper rear side.
FIG. 4C is an external perspective view of the retaining member as viewed from a lower rear side.
FIG. 4D is a top view of the retaining member.
FIG. 4E is a front view of the retaining member.
FIG. 4F is a rear view of the retaining member.
FIG. 4G is a bottom view of the retaining member.

As illustrated in FIGS. 1A and 1B, the connector of the present invention takes the form of a female connector 10 including a female connector housing 100, a lock member 200, and a retaining member 300. Note that, in the following description, a direction in which the female connector 10 is mated to a male connector 90 (see FIGS. 8A to 8D) which is a mating connector is referred to as a mating direction, a side to be mated is referred to as a front side, and an opposite side is referred to as a rear side. In addition, a direction orthogonal to the mating direction and parallel to a main plane (for example, upper surface) of the female connector housing 100 to which the lock member 200 and the retaining member 300 are attached will be referred to as a width direction, and a direction orthogonal to both the mating direction and the width direction will be referred to as a vertical direction.

[Female Connector Housing]

As illustrated in FIGS. 2A to 2D, the female connector housing 100 includes a mating portion 110 to be mated to the male connector 90 and an attachment portion 130 to be attached to a circuit board (not illustrated). The mating portion 110 has a substantially flat rectangular parallelepiped shape whose width is larger than a height in the vertical direction and a length in the mating direction, and includes a mating upper surface 111, a mating lower surface 112, a mating front surface 113, and mating side surfaces 114 and 115. The attachment portion 130 also has a substantially flat rectangular parallelepiped shape whose width is larger than a height in the vertical direction and a length in the mating direction, and includes an attachment upper surface 131, an attachment lower surface 132, an attachment rear surface 133, and attachment side surfaces 134 and 135. Note that the width and length of each of the mating portion 110 and the attachment portion 130 are not limited to the above, and the length may be larger than the width.

The rear portion of the mating portion 110 and the front portion of the attachment portion 130 are integrally connected to each other, and the attachment upper surface 131 is one step higher upward than the mating upper surface 111. A boundary portion between the mating upper surface 111 and the attachment upper surface 131 is an upper step 136 with which the rear surface upper portion of a male connector housing 900 (see FIGS. 8A to 8D) of the male connector 90 abuts. Further, the attachment side surfaces 134 and 135 are formed at positions protruding outward in the width direction from the mating side surfaces 114 and 115, respectively. Then, boundary portions between the mating side surfaces 114 and 115 and the attachment side surfaces 134 and 135 are side shoulder portions 137 and 138 with which rear surface side portions of the male connector housing 900 of the male connector 90 abuts, respectively.

Further, in the attachment rear surface 133, portions of the attachment side surfaces 134 and 135 protrude rearward, and a substrate attachment fixture 139 is press-fitted and fixed or insert-molded in the protruding portion, and extends from the attachment lower surface 132 to form a fixing portion to the substrate.

Figure 7A:
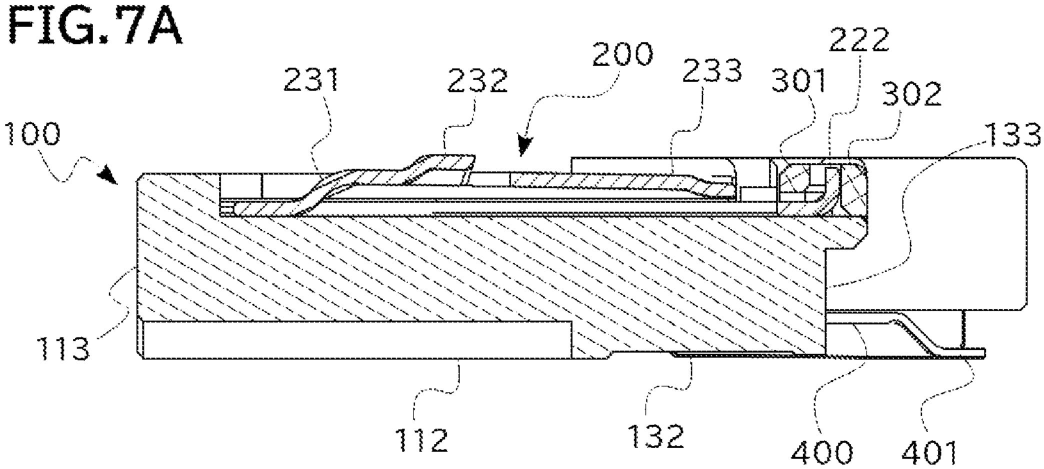
FIG. 7A is a cross-sectional view taken along line VIIA-VIIA of FIG. 6C.
Figure 7B:
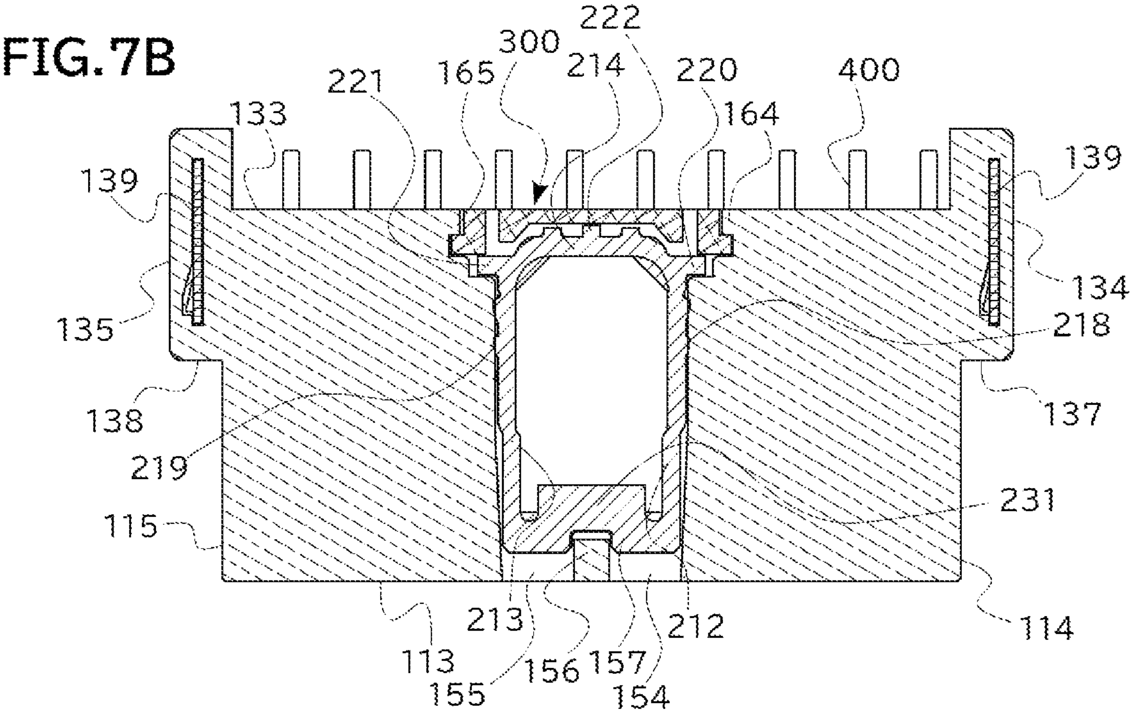
FIG. 7B is a cross-sectional view taken along line VIIB-VIIB of FIG. 6B.

The connector of the present invention includes at least one contact. In the present embodiment, the female connector 10 includes ten female contacts 400 (see FIG. 5C). Specifically, ten contact accommodation ports 140 are formed in the female connector housing 100 so as to penetrate the attachment rear surface 133 from the mating front surface 113, and the female contacts 400 are held one by one inside each contact accommodation port 140. As illustrated in FIGS. 7A and 7B, each female contact 400 includes a terminal 401 bent such that a rear portion thereof is exposed from the attachment rear surface 133 of the female connector housing 100 and is positioned substantially in the same plane as the attachment lower surface 132.

Further, the female connector housing 100 includes a fixing slot 150 on one of the outer surfaces. In the present embodiment, the fixing slot 150 is formed to be recessed downward from the upper surface of the female connector housing 100, that is, from the attachment upper surface 131 to the mating upper surface 111. An introduction opening 160 is formed on the rear side in the mating direction with respect to the fixing slot 150, communicates to the fixing slot 150, and is opened rearward on the attachment rear surface 133. Therefore, the upper side of the fixing slot 150 is open and the rear side thereof communicates to the introduction opening 160, and both the rear side and the upper side of the introduction opening 160 communicate to the outside.

In the fixing slot 150, a width of a bottom portion 151 is the same as or slightly narrower than a width of the lock member 200 to be described later, and the lock member 200 can be fixed by being press-fitted from the rear. Further, in the fixing slot, a width of an upper portion of the bottom portion 151 is narrower than the width of the bottom portion 151. That is, the mating upper surface 111 and the attachment upper surface 131 protrude inward in the width direction above the fixing slot 150 to form side protruding edge portions 152 and 153. A gap is formed between the side protruding edge portions 152 and 153 and the bottom portion 151. Frame side portions 212 and 213 of the lock member 200 described later are inserted into these gap portions. The frame side portions 212 and 213 inserted into the gap are prevented from moving upward by the side protruding edge portions 152 and 153.

As illustrated in FIGS. 2A, 2C, and 7B, in a front portion of the bottom portion 151 of the fixing slot 150, through slots 154 and 155 are formed in a portion other than the central portion and penetrate the mating front surface 113, and a columnar support 156 is formed in the central portion. The mating upper surface 111 is connected to the columnar support 156 and covers the upper sides of the through slots 154 and 155 on both sides thereof to form cover portions 157 and 158. The columnar support 156 prevents forward movement of the lock member 200 by abutting on a frame front portion 211 of the lock member 200 described later. Further, the frame front portion 211 of the lock member 200 is inserted below the cover portions 157 and 158 to prevent the lock member 200 from moving upward.

The introduction opening 160 has a shape that can receive the retaining member 300 described later by being inserted in a direction different from the mating direction, that is, from above in the present embodiment. As illustrated in FIG. 2C, the introduction opening 160 includes an opening front portion 161, an opening middle portion 162, and an opening rear portion 163. Widths of the opening front portion 161, the opening middle portion 162, and the opening rear portion 163 are larger than a width of the fixing slot 150. The width of the opening middle portion 162 is larger than the widths of the opening front portion 161 and the opening rear portion 163. In other words, the width of the opening rear portion 163 is narrower than the width of the opening middle portion 162.

A width of the opening rear portion 163 is narrower than the maximum width of the retaining member 300 described later. That is, a length of the introduction opening 160 in the width direction is shorter than a length of the retaining member 300 in the width direction on the rear side. Furthermore, as illustrated in FIG. 2B, the opening rear portion 163 includes protrusions to be locked 164 and 165 corresponding to locking claws of the retaining member 300 described later on an upper side of a side wall, and these protrusions protrude inward in the width direction. Thus, a length of the opening rear portion 163 in the width direction is narrower on a front side than on a rear side in the insertion direction of the retaining member 300 described later, that is, narrower on an upper side than on a bottom side.

[Lock Member]

The lock member 200 is formed by punching a metal flat plate, and includes a frame member 210 having a substantially quadrangular outer shape and a lever member 230 as illustrated in FIGS. 3A to 3D. A length in the mating direction of the frame member 210 is substantially the same as a length in the mating direction of the fixing slot 150, and a width thereof is the same as or slightly wider than a width of the bottom portion 151 of the fixing slot 150.

The frame member 210 includes the frame front portion 211, the frame side portions 212 and 213, and a frame rear portion 214. A rear side of the frame front portion 211 is continuously connected to the lever member 230. A frame recess 215 recessed rearward is formed in a front central portion of the frame front portion 211 to increase elasticity of the lever member 230 in the vertical direction, and is a portion to which the columnar support 156 is fitted when the lock member 200 is inserted into the fixing slot 150.

The lever member 230 is separated from the frame side portions 212 and 213 by slots 216 and 217, so that the lever member 230 can be displaced in a cantilever manner with a connection portion with the frame front portion 211 as a fulcrum. Hooking portions 218 and 219 that are uneven in the width direction are formed on outer portions of the frame side portions 212 and 213 in the width direction, and when the lock member 200 is inserted into the fixing slot 150, the lock member bites into a side surface of the fixing slot 150 to maintain a press-mated state.

At rear ends of the frame side portions 212 and 213, abutting portions 220 and 221 are formed. The abutting portions 220 and 221 protrude outward in the width direction and are bent frontward in the insertion direction of the retaining member 300 to be described later, that is, upward. The abutting portions 220 and 221 abut on a front end surface of the retaining member 300. Note that the abutting portions 220 and 221 may be formed so as to slightly protrude rearward from the rear ends of the frame side portions 212 and 213 and bend upward immediately thereafter.

A positioning protrusion 222 protruding so as to bend frontward, that is, upward in the insertion direction of the retaining member 300 to be described later is formed at a rear central portion of the frame rear portion 214. The positioning protrusion 222 is received in a positioning opening 309 formed in the retaining member 300 described later.

The lever member 230 has a lever front portion 231 continuously connected to the frame front portion 211, and includes a lock projection 232 protruding upward from a main body portion of the lever member 230 and locked to a portion to be locked 920 of the male connector 90 to be described later, and a lever arm 233. The lever arm 233 has a flat plate shape and functions as a point of force for vertically displacing the lever member 230 body in a cantilever manner with a connection portion between the lever front portion 231 and the frame front portion 211 as a fulcrum.

[Retaining Member]

As illustrated in FIGS. 4A to 4G, the retaining member 300 as a whole corresponds to a width length of the introduction opening 160, and is long in the width direction. The width of the retaining member 300 in the width direction is larger than the width of the fixing slot 150 in the width direction. The retaining member 300 includes a main body front portion 301 and a main body rear portion 302. A width in the width direction of the main body front portion 301 is wider than a width in the width direction of the main body rear portion 302, and is substantially equal to the width in the width direction of the opening middle portion 162 of the introduction opening 160 described above, and is a width received by the opening middle portion 162. The retaining member 300 includes locking claws 303 and 304 protruding laterally on bottom sides of both side portions of the main body rear portion 302. Bottom surface sides of the locking claws 303 and 304 are separated from the main body rear portion 302 by bottom surface slots 305 and 306, and can be slightly displaced inward in the width direction.

Since the locking claws 303 and 304 are formed in the main body rear portion 302, a rear side in the insertion direction of the retaining member 300 is wider than a front side, that is, a lower side is wider than an upper side. As described above, in the introduction opening 160 corresponding to this, the protrusions to be locked 164 and 165 protrude inward in the width direction above the side walls. Therefore, when the retaining member 300 is inserted into the introduction opening 160 from above, the locking claws 303 and 304 of the retaining member 300 are engaged with the protrusions to be locked 164 and 165 of the introduction opening 160 by the snap-type locking structure.

A recess 307 for receiving the frame rear portion 214 of the lock member 200 is formed on a bottom side of the main body front portion 301 of the retaining member 300. Further, a positioning opening 309 penetrating the recess 307 is formed in a central portion of the retaining member upper surface 308 of the retaining member 300. The positioning opening 309 receives the positioning protrusion 222 of the lock member 200.

Now, an assembly process of the female connector 10 having the above-described configuration will be described with reference to FIGS. 5A to 5C and FIGS. 6A to 6C. First, as can be seen with reference to FIGS. 1B and 5A, the lock member 200 is attached to the female connector housing 100. The lock member 200 is inserted from the rear toward the front of the female connector housing 100 from the introduction opening 160 along the mating direction, and then press-fitted and fixed into the fixing slot 150. At this time, the frame side portions 212 and 213 of the lock member 200 move along side surfaces of the bottom portion 151 of the fixing slot 150, and the hooking portions 218 and 219 bite into the side surfaces and are press-fitted and fixed.

Also at this time, the frame front portion 211 of the lock member 200 reaches a front end portion of the fixing slot 150 and enters the through slots 154 and 155. Further, the columnar support 156 is fitted into and abuts on the frame recess 215 of the frame front portion 211. At this time, the frame side portions 212 and 213 are positioned below the side protruding edge portions 152 and 153. Thus, the lock member 200 is prevented from moving forward and upward.

Further, at this time, as illustrated in FIG. 5C, the abutting portions 220 and 221 of the lock member 200 are located in the opening front portion 161 of the introduction opening 160, and the frame rear portion 214 is located in the opening middle portion 162.

Next, as illustrated in FIGS. 6A to 6C, the retaining member 300 is inserted into the introduction opening 160 and fixed to the introduction opening 160. The retaining member 300 is inserted from a direction different from the mating direction, and in the present embodiment, the retaining member 300 is inserted into the introduction opening 160 from above. At this time, the main body front portion 301 of the retaining member 300 is received in the opening middle portion 162, and the main body rear portion 302 is received in the opening rear portion 163. Then, the positioning opening 309 of the retaining member 300 receives the positioning protrusion 222 of the lock member 200.

Here, when the main body rear portion 302 is inserted into the opening rear portion 163, the locking claws 303 and 304 come into contact with the protrusions to be locked 164 and 165, and downward insertion is prevented. When the main body rear portion 302 is further pushed downward while resisting the repulsive force of the protrusions to be locked 164 and 165, the locking claws 303 and 304 are slightly deformed inward in the width direction due to the presence of the bottom surface slots 305 and 306, and can be further inserted downward. When the retaining member 300 is further moved downward, the locking claws 303 and 304 return to the original state at the time of passing through the protrusions to be locked 164 and 165. Thus, the locking claws 303 and 304 of the retaining member 300 are locked in a snap manner with the protrusions to be locked 164 and 165.

At this time, as illustrated in FIG. 6C, a front surface of the main body front portion 301 of the retaining member 300 serves as a contact surface with the abutting portions 220 and 221 of the lock member 200, and prevents the lock member 200 from moving rearward. In addition, the positioning protrusion 222 of the lock member 200 is in the positioning opening 309, which also prevents the lock member 200 from moving rearward.

As illustrated in FIGS. 8A to 8D, the female connector 10 assembled as described above is mated to the male connector 90. The male connector housing 900 of the male connector 90 is formed with a mating opening 910 that receives the mating portion 110 of the female connector housing 100. In addition, a male contact (not illustrated) electrically connected to the female contact held by the female connector housing 100 extends in the mating opening 910. The portion to be locked 920 having an opening shape is formed on an upper surface of the male connector housing 900.

The female connector 10 is moved forward to insert the mating portion 110 into the mating opening 910 of the male connector housing 900. Then, each male contact is inserted into each contact accommodation port 140, and each female contact is electrically connected to each male contact inside. Then, the upper step 136 and the side shoulder portions 137 and 138 of the female connector housing 100 abut on a rear end portion of the mating opening 910 of the male connector housing 900, and the insertion of the mating portion 110 into the mating opening 910 is stopped.

At this time, the lock projection 232 of the lever member 230 of the lock member 200 is locked to the portion to be locked 920 of the male connector housing 900, and the engagement state of the female connector 10 with the male connector 90 which is the mating connector is maintained. Further, the lever arm 233 of the lever member 230 is on a rear side of the rear end of the mating opening 910 of the male connector housing 900 and above the fixing slot 150. When the lever arm 233 is pushed downward with a finger or the like, the lock projection 232 can be lowered downward and unlocked from the portion to be locked 920, and the mating portion 110 of the female connector 10 can be moved backward and removed from the mating opening 910 of the male connector 90.

[Modified Embodiment]

In the above embodiment, an example in which each female contact 400 has the terminal 401 mounted on the substrate surface has been described, but the present invention is not limited to the above embodiment. As illustrated in FIGS. 9A to 9D, the contacts of the present disclosure may be of a type connected to electric wires. A female connector 10A of a modified embodiment illustrated in FIGS. 9A to 9D is slightly different from the female connector 10 of the above embodiment in an outer shape of the female connector housing 100A and a type of a female contact (not illustrated) to be accommodated therein. However, since the basic configurations of a fixing slot 150A, an introduction opening 160A, a lock member 200A, and a retaining member 300A formed in the female connector housing 100A are substantially the same as those in the above embodiment, a detailed description thereof will be omitted.

As illustrated in FIGS. 9A to 9D, in the female connector housing 100A of the modified embodiment, four contact accommodation ports 140A are formed so as to penetrate the attachment rear surface 133A from a mating front surface 113A of the female connector housing 100A. Each contact accommodation port 140A accommodates a female contact (not illustrated). The female contact is connected to an electric wire W in the contact accommodation port 140A, and the electric wire W extends rearward from the attachment rear surface 133A.

In the above embodiment and modified embodiment, the lock members 200 and 200A are made of metal, but the material of the lock member may not be metal, and may be made of resin.

Further, in the embodiment and the modified embodiment described above, although the fixing slots 150 and 150A and the introduction openings 160 and 160A are formed in upper surfaces of the female connector housings 100 and 100A, the fixing slots may be formed in lower surfaces or may be formed in one of side surfaces. In either case, the lock members 200 and 200A are press-fitted and fixed to the fixing slots 150 and 150A from a rear side of the female connector housings 100 and 100A via the introduction openings 160 and 160A. Further, the retaining members 300 and 300A are configured to be inserted from below when the fixing slots 150 and 150A are formed in the lower surface. On the other hand, when the fixing slots 150 and 150A are formed in the side surfaces, the retaining members 300 and 300A are fixed to the introduction openings 160 and 160A by being configured to be inserted from the side. In either case, the retaining members 300 and 300A prevent the lock members 200 and 200A from moving rearward.

Further, in the above embodiment and modified embodiment, the case where the retaining members 300 and 300A are inserted from above orthogonal to the direction in which the lock members 200 and 200A are inserted has been described, but the present invention is not limited thereto, and the retaining members may be inserted from obliquely above. Similarly, when the fixing slots 150 and 150A and the introduction openings 160 and 160A are formed in the lower surfaces of the female connector housings 100 and 100A, the retaining member 300 may be inserted obliquely from below. Further, when the fixing slots 150 and 150A and the introduction openings 160 and 160A are formed in the side surfaces of the female connector housings 100 and 100A, the retaining member 300 may be inserted obliquely from the side.

What is claimed is:

1. A connector comprising:

at least one contact;

a connector housing that holds the contact inside thereof and that includes a fixing slot in one of outer surfaces thereof and an introduction opening that communicates to the fixing slot on a rear side in a mating direction of the connector;

a lock member that is press-fitted and fixed to the fixing slot by being inserted from the introduction opening along the mating direction, and keeps the connector housing at a mated state with a mating connector when being locked to a portion to be locked of the mating connector; and a retaining member that is fixed to the introduction opening by being inserted from a direction different from the mating direction and prevents movement of the lock member rearward in the mating direction.

2. The connector according to claim 1, wherein both a rear side of the introduction opening in the mating direction and one side of the introduction opening in a vertical direction orthogonal to the mating direction are communicative to an outside.

3. The connector according to claim 2, wherein a width of the introduction opening is narrower than a width of the retaining member at a rear side in the mating direction.

4. The connector according to claim 3, wherein the width of the introduction opening is narrower on a front side thereof than on a rear side thereof in an insertion direction orthogonal to both the mating direction and the width direction, and the width of the retaining member is wider on a rear side thereof than on the front side thereof in the insertion direction.

5. The connector according to claim 4, wherein the retaining member includes a locking claw, the introduction opening includes a protrusion to be locked corresponding to the locking claw, and the locking claw and the protrusion to be locked are engaged with each other by a snap-type locking structure.

6. The connector according to claim 1, wherein the lock member includes, at a rear end in the mating direction, an abutting portion that is bent frontward in an insertion direction orthogonal to both the mating direction and a width direction orthogonal to the mating direction and abuts on the retaining member.

7. The connector according to claim 6, wherein the lock member includes a positioning protrusion bent frontward in the insertion direction on a rear side in the mating direction, and the retaining member includes a positioning opening that receives the positioning protrusion.

* * * * *